United States Patent [19]

Amano et al.

[11] Patent Number: 4,482,962

[45] Date of Patent: Nov. 13, 1984

[54] ENGINE CONTROL METHOD

[75] Inventors: Matsuo Amano; Toru Sugawara; Toshio Furuhashi; Masumi Imai, all of Ibaraki, Japan

[73] Assignee: Hitachi, Ltd., Tokyo, Japan

[21] Appl. No.: 577,613

[22] Filed: Feb. 6, 1984

Related U.S. Application Data

[63] Continuation of Ser. No. 181,761, Aug. 27, 1980, abandoned.

[30] Foreign Application Priority Data

Sep. 5, 1979 [JP] Japan .............................. 54-112953

[51] Int. Cl.³ .......................... G06F 9/46; G05B 15/02
[52] U.S. Cl. ................................ 364/431.11; 364/200
[58] Field of Search .................. 364/200, 900, 431.11, 364/431.12, 431.04, 431.05; 123/416, 417, 480, 486; 73/204

[56] References Cited

U.S. PATENT DOCUMENTS

| | | | |
|---|---|---|---|
| 3,327,294 | 6/1967 | Furman et al. | 364/900 |
| 3,825,902 | 7/1974 | Brown et al. | 364/200 |
| 3,905,025 | 9/1975 | Davis et al. | 364/200 |
| 4,005,391 | 1/1977 | MacPherson | 364/200 |
| 4,091,447 | 5/1978 | Dillon et al. | 364/200 |
| 4,152,761 | 5/1979 | Louie | 364/200 |
| 4,280,189 | 7/1981 | Takato et al. | 364/431.12 |
| 4,282,573 | 8/1981 | Imai et al. | 364/431.11 |
| 4,297,881 | 11/1981 | Sasayama et al. | 73/204 |
| 4,298,941 | 11/1981 | Furuhashi | 364/431.04 |
| 4,312,038 | 1/1982 | Imai et al. | 364/431.12 |
| 4,337,513 | 6/1982 | Furuhashi | 364/431.11 |
| 4,355,360 | 10/1982 | Asano et al. | 364/431.11 |
| 4,363,097 | 12/1982 | Amano et al. | 364/431.11 |

OTHER PUBLICATIONS

Korn: Microprocessor and Small Digital Computer Systems for Engineers and Scientists (Textbook), McGraw-Hill Book Co., 1977, pages of interest: 2,3, 140–155, 260–271, Scientific Library QA 76.5/K67.

Primary Examiner—Felix D. Gruber
Attorney, Agent, or Firm—Antonelli, Terry & Wands

[57] ABSTRACT

A method of electronically controlling the operation of an internal combustion engine is effected on the basis of results of arithmetic operations of digital control quantities derived from detected operating conditions of the engine through digital processing operations. The digital processing operations are subdivided into a number of tasks in dependence on the control functions to be performed. In addition, these tasks are subdivided into a plurality of priority levels. The memory has a task control block having run or execution flag areas in response to the priority levels and start request flag areas in response to the tasks, the start request flag areas being classified in accordance with the levels, in order to make it easy to correct, alter or add tasks. An order for starting the execution of the task is always controlled in accordance with the condition of the run flags and the start request flags.

29 Claims, 21 Drawing Figures

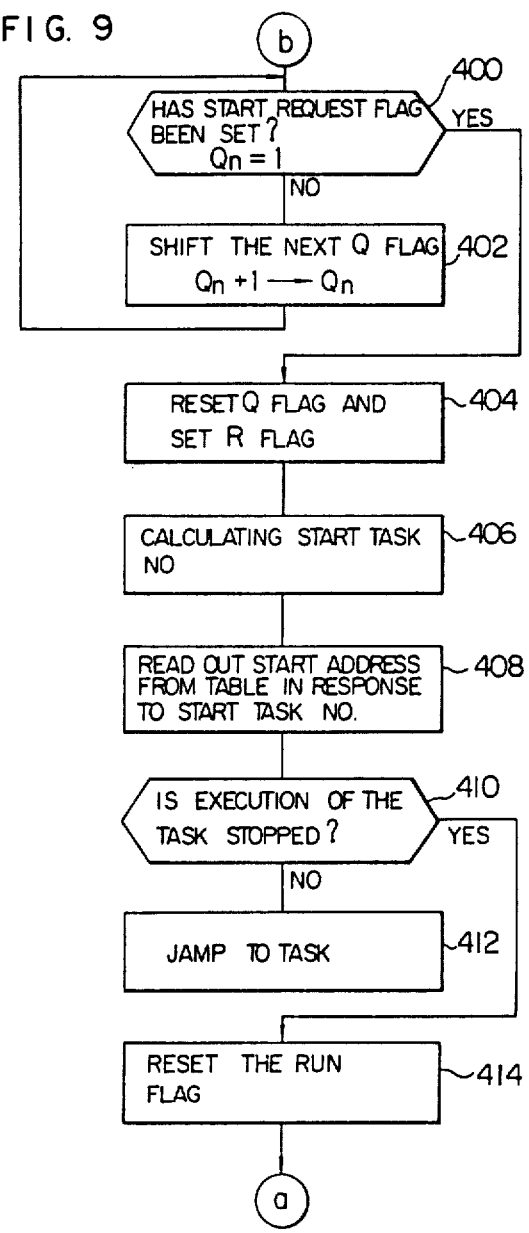

ENGINE CONTROL METHOD

This is a continuation of Application Ser. No. 181,761 filed Aug. 27, 1980 now abandoned.

FIELD OF THE INVENTION

This invention relates to an electronic control method for an internal combustion engine.

BACKGROUND OF THE INVENTION

Recently, a micro-computer has been employed for controlling an internal combustion engine. The micro-computer is mainly used to arithmetically determine the fuel quantity supplied to the engine and the ignition timing for igniting the supplied fuel. The fuel supply and the ignition of the supplied fuel are caused to occur in synchronization with the engine shaft rotation. Therefore, under the condition of the high speed engine rotation, the interval between the fuel supply timing or ignition timing becomes shorter, and it is difficult to perform all the arithmetical operations for determining the fuel supply quantity and ignition timing. It is necessary to reduce the number of arithmetical operations of the computer under the condition of the high speed engine rotation. For such a purpose, the program for arithmetically determining the fuel supply quantity and the ignition timing is subdivided into a plurality of tasks and these tasks are classified into a plurality of priority levels in accordance with their influence on the engine operation. When the timing of the fuel supply and ignition becomes shorter in accordance with the higher speed of the engine rotation, only the tasks of the higher level are performed by the computer and the results of the lower level tasks which have been already calculated are repetitively used in order to decrease the number of calculations.

In such a program, the program for determining the fuel quantity or ignition timing has many tasks each of which has a priority level and relationship with others. Since such program system is complicated, it is difficult to correct, alter or add various control functions.

An object of the present invention is to provide an electronic control method for an internal combustion engine wherein it is easy to correct, alter or add various control functions for the internal combustion engine.

The program for controlling the internal combustion engine comprises a plurality of tasks each of which has a start period for repeatedly starting the performance of the task. In addition, each task has a respective priority level. In the present invention, a memory has a task control block which has flag areas for setting start request flags and run flag areas for setting run flags. The start request flag of the task is set in response to the expiration of the start period of the task. The run flag is set in response to the start of the performance of the task and is reset in response to the completion of the performance of the task. The task to be started is determined by the conditions of the start request flag and the run flag.

In this system, start of the task performance is not changed by amendment, correction or addition of another task. In addition, it is possible, without changes of the priority level or start period of another task, to add a new task or to omit one task.

BRIEF DESCRIPTION OF THE DRAWINGS

The above and other objects, features and advantages of the present invention will become more apparent from the following description taken in conjunction with the accompanying drawings, in which:

FIGS. 8 and 9 are diagrams showing the processing operation flowcharts of the task dispatcher;

DETAILED DESCRIPTION OF THE INVENTION

Figure 1:
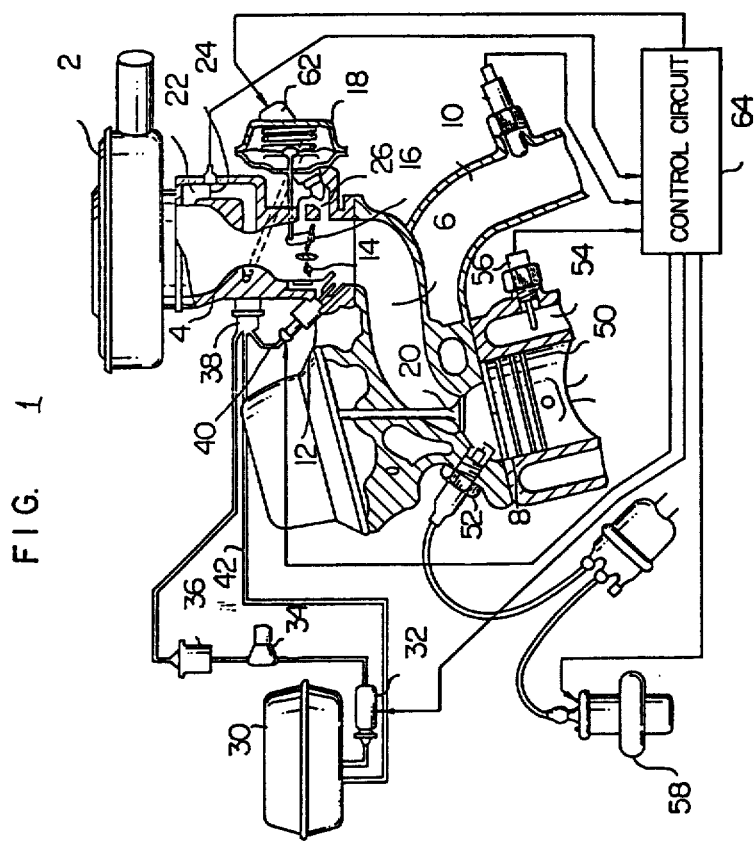
FIG. 1 is a constructional view showing a control apparatus for the overall engine system.

FIG. 1 shows control apparatus for the overall engine system. Referring to the figure, suction air is supplied to a cylinder 8 through an air cleaner 2, a throttle chamber 4 and a suction pipe 6. Combustion products in the cylinder 8 are emitted from the cylinder 8 into the air through an exhaust pipe 10.

The throttle chamber 4 is provided with an injector 12 for injecting fuel. The fuel supplied from the injector 12 is atomized within an air passage of the throttle chamber 4 and is mixed with the suction air to form a mixture. This mixture passes through the suction pipe 6, and is supplied to a combustion chamber of the cylinder 8 upon opening of a suction valve 20.

Throttle valves 14 and 16 are disposed near the outlet of the injector 12. The throttle valve 14 is constructed so as to mechanically interlock with an accelerator pedal, and is driven by a driver. On the other hand, the throttle valve 16 is arranged so as to be driven by means of a diaphragm 18. It becomes fully closed in a region in which the flow rate of the air is low. As the flow rate of air increases, the negative pressure on the diaphragm 18 increases, whereby the throttle valve 16 begins to open so as to suppress an increase in the suction resistance.

Upstream of the throttle valves 14 and 16 of the throttle chamber 4, an air passage 22 is provided. An electric heating element 24 which is employed as a component of a thermal type air flowmeter is disposed in the air passage 22, to provide an electric signal varying in response to air flow velocity, as determined by a relationship between the air flow velocity and the quantity of heat transfer of the heating element. Since the heating element 24 is disposed within the air passage 22, it is protected from a high-temperature gas which may be produced in the throttle chamber 4, and it is also protected from being corroded by dust, etc., in the suction air. The outlet of the air passage 22 is open to the vicinity of the narrowest part of a Venturi tube, and the inlet thereof is open onto the upper stream side of the Venturi tube.

The fuel to be fed to the injector 12 is supplied from a fuel tank 30 to a fuel pressure regulator 38 through a fuel pump 32, a fuel damper 34 and a filter 36. On the other hand, the pressurized fuel is supplied from the fuel pressure regulator 38 to the injector 12 through a pipe 40. The fuel is returned from the fuel pressure regulator 38 to the fuel tank 30 through a return pipe 42 so that the difference between the pressure of the suction pipe 6 into which the fuel is injected from the injector 12 and the pressure of the fuel to the injector 12 may become constant at all times.

The mixture sucked in from the suction valve 20 is compressed by a piston 50, and is brought into combustion by sparking owing to an ignition plug 52, the combustion being converted into kinetic energy. The cylinder 8 is cooled with cooling water 54, the temperature of which is measured by a water temperature sensor 56, the measured value being utilized as engine temperature. The ignition plug 52 is supplied with a high voltage from an ignition coil 58 in conformity with an ignition timing.

A crankshaft (not shown) is provided with a crank angle sensor which provides a reference angle signal and a position signal every reference crank angle and every fixed angle (for example, 0.5 degree) in accordance with its rotation.

The outputs of the crank angle sensor, the output 56A of the water temperature sensor 56 and the electric signal from the heating element 24 are applied to a control circuit 64 made up of a microcomputer, etc., and are operated and processed by the control circuit 65. The injector 12 and the ignition coil 58 are driven by outputs from the control circuit 64.

In the engine system which is controlled on the basis of the above construction, the throttle chamber 4 is provided with a bypass 26 which is coupled to the throttle valve 16 of the throttle chamber and communicates with the suction pipe 6. The bypass 26 is provided with a bypass valve 62 which is controlled so as to open or close. The control to open or close the bypass valve 62 is carried out in such a way that the driving portion thereof is supplied with a control input from the control circuit 64.

The bypass valve 62 is caused to face the bypass 26 disposed around the throttle valve 16, and is controlled by a pulse current so as to open or close. This bypass valve 62 functions to vary the cross-sectional area of the bypass 26 through the magnitude of lift of the valve. The magnitude of lift is controlled in such a manner that a driving system is driven by an output of the control circuit 64. More specifically, the control circuit 64 generates an opening-and-closing period signal in order to control the driving system, and on the basis of the opening-and-closing period signal, the driving system supplies to the driving portion of the bypass valve 62 a control signal for regulating the magnitude of lift of the bypass valve 62.

Figure 2:
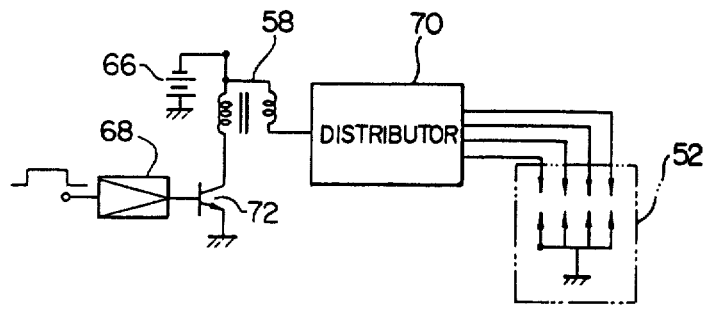
FIG. 2 is an explanatory view of an ignition device in FIG. 1.

FIG. 2 is an explanatory view of the ignition device in FIG. 1. A pulse current is supplied to a power transistor 72 through an amplifier 68, and the transistor 72 is turned "on" by this current. Thus, a primary coil current flows through the ignition coil 58 from a battery 66. The transistor 72 is turned "off" by the trailing edge of this pulse current, to generate a high voltage across a secondary coil of the ignition coil 58.

The high voltage is distributed through a distributor 70 to the ignition plugs 52 disposed in the respective cylinders of the engine crankshaft, in synchronism with the engine rotation.

Figure 3:
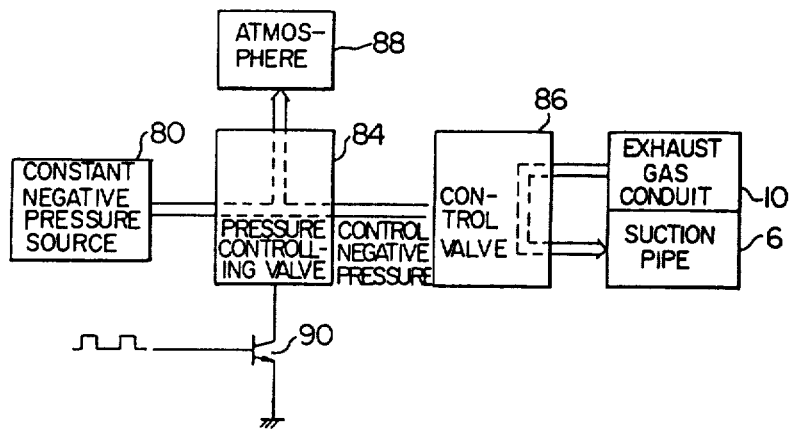
FIG. 3 is a construction view for explaining an exhaust gas recirculating system.

FIG. 3 serves to explain an exhaust gas recirculation ("EGR") system. A fixed negative pressure of a negative pressure source 80 is applied to a controlling valve 86 through a pressure control valve 84. The pressure control valve 84 controls the state of the application of the negative pressure to the controlling valve 86 by controlling the proportion of releasing the fixed negative pressure of the negative pressure source into the air 88 in accordance with the "on" duty ratio of recurrent pulses impressed on a transistor 90. Accordingly, the negative pressure to be applied to the controlling valve 86 is determined by the "on" duty ratio of the transistor 90. The EGR quantity from the exhaust pipe 10 to the suction pipe 6 is controlled by the controlled negative pressure of the pressure determining valve 84.

Figure 4:
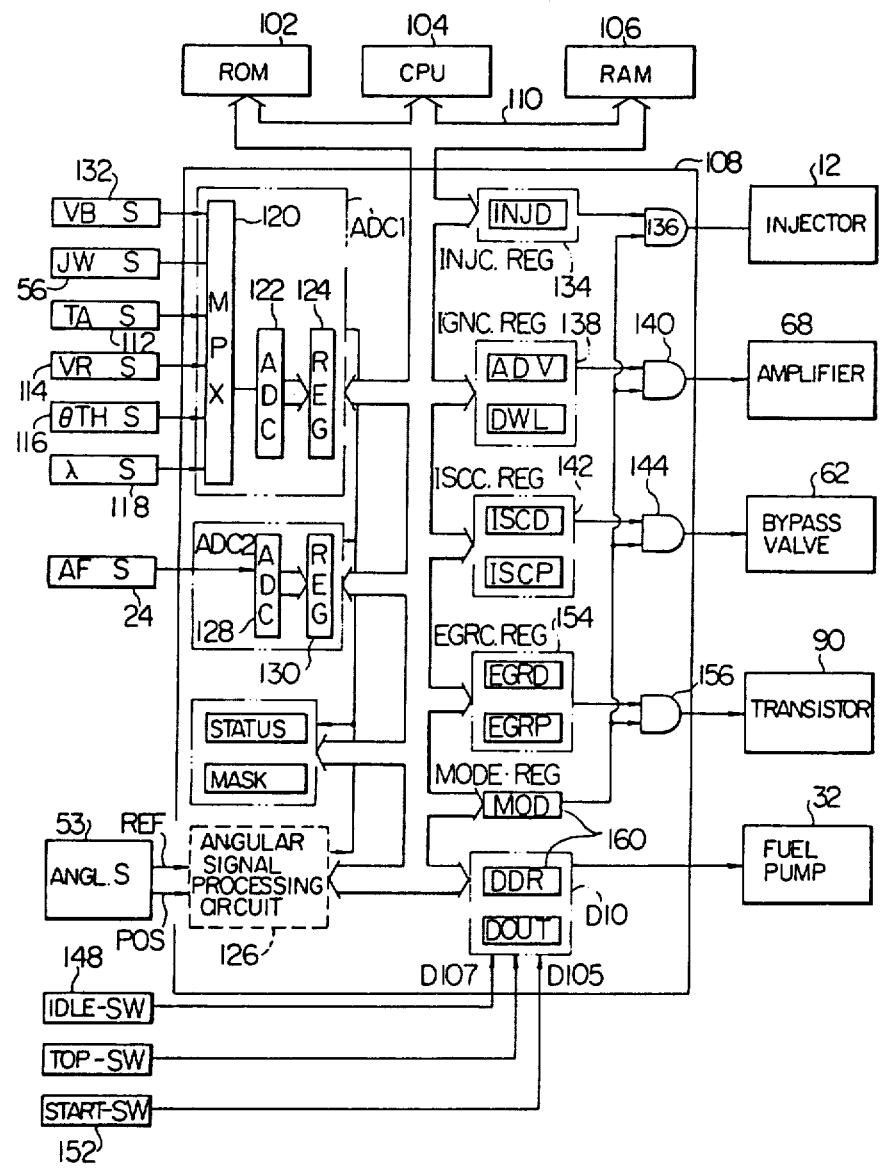
FIG. 4 is a general arrangement diagram of an engine control system.

FIG. 4 is a diagram of the general construction of the control system. The control system is constructed of a CPU 102, a read only memory (ROM) 104, a random access memory (RAM) 106, and input/output circuitry 108. The CPU 102 operates on input data from the input/output circuitry 108 and couples the operated results back to the input/output circuitry 108 in accordance with various programs stored in the ROM 104. Intermediate storage necessary for these operations make use of the RAM 106. The exchanges of various data among the CPU 102, the ROM 104, the RAM 106 and the input/output circuitry 108 are performed by a bus line 110 which consists of a data bus, a control bus and an address bus.

The input/output circuitry 108 has input means of a first analog-to-digital converter ("ADC1"), a second analog-to-digital converter ("ADC2"), an angle signal processing circuit 126, and a discrete input/output circuit ("DIO") for receiving and delivering 1-bit information.

In the ADC1, outputs from a battery voltage detecting sensor 132 ("VBS"), the cooling water temperature sensor 56 ("TWS"), an air temperature sensor 112 ("TAS"), an adjustment voltage generator 114 ("VRS"), a throttle angle sensor 116 ("$\theta$THS"), and a $\lambda$ sensor 118 ("$\lambda$S") are applied to a multiplexer 120, and one of them is selected and applied to an analog-to-digital converter circuit 122 ("ADC") by means of the MPX 120. A digital value which is an output of the ADC 122 is stored in a register 124 (hereinbelow, written "REG").

The output from the flow rate sensor 24 ("AFS") is applied to the ADC2 and is converted through an analog-to-digital converter circuit 128 ("ADC") into a digital value, which is stored in a register 130 ("REG").

An angle sensor 146 ("ANGS") provides a signal indicative of a reference crank angle, for example, 180-degree crank angle ("REF") and a signal indicative of a minute angle, for example, 1-degree crank angle ("POS"). The signals are applied to the angle signal processing circuit 126 and are wave-shaped therein.

The DIO receives outputs from an idle switch 148 ("IDLE-SW"), a top gear switch 150 ("TOP-SW") and a starter switch 152 ("START-SW").

Now, there will be described pulse output circuits and controlled systems which are based on the operation results of the CPU. An injector control circuit ("INJC") is a circuit which converts the digital value of the operation result into a pulse output. Accordingly, a pulse which has a pulse width corresponding to the quantity of fuel injection is prepared by the INJC 134 and is applied to the injector 12 through an AND gate 136.

An ignition pulse generator circuit 138 ("IGNC") has a register ("ADV") in which the ignition timing is stored, and a register ("DWL") in which the primary current conduction-starting time of the ignition coil is stored. These data are supplied from the CPU. Pulses are generated on the basis of the stored data, and are applied through an AND gate 140 to the amplifier 68 described in detail with reference to FIG. 2.

The valve opening proportion of the bypass valve 62 is controlled by pulses which are impressed on the valve from a control circuit ("ISCC") 142 through an AND gate 144. The ISCC 142 has a register ISCD which stores the pulse width and a register ISCP which stores the recurrent pulse period.

An EGR quantity control pulse-generator circuit 154 ("EGRC") which controls the transistor 90 for controlling the EGR controlling valve 86 shown in FIG. 3 has a register EGRD in which a valve representative of the duty cycle of pulses is stored and a register EGRP in which a value representative of the recurrent period of the pulses is stored. The output pulses of the EGRC are impressed on the transistor 90 through an AND gate 156.

Input/output signals of one bit are controlled by the circuit DIO. As the input signals, there are the IDLE-SW signal, the TOP-SW signal and the START-SW signal. As the output signal, there is a pulse output signal for driving the fuel pump. The DIO is provided with a register DDR for determining whether terminals are to be used as input terminals or as output terminals, and a register DOUT for latching output data.

A register 160 is a register ("MODE") which holds instructions for various states inside the input/output circuitry 108. For example, by setting an instruction in this register, all the AND gates 136, 140, 144 and 156 are turned "on" or turned "off". By setting instructions in the MODE register 160 in this manner, the stops and starts of the outputs of the INJC and the IGNC or ISCC can be controlled.

Figure 5:
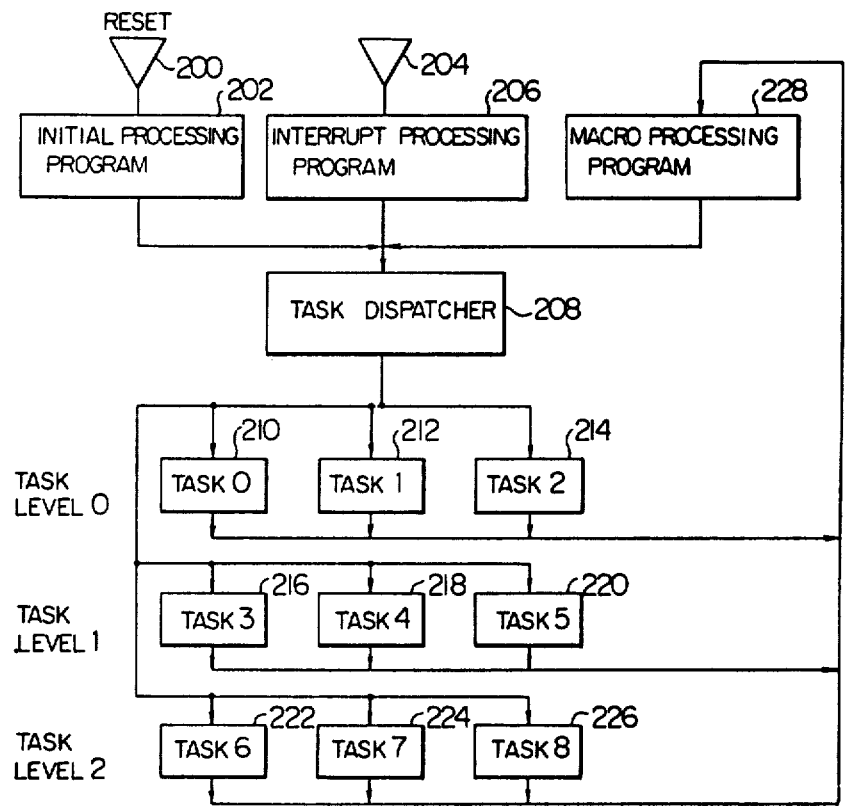
FIG. 5 is a diagram showing the fundamental arrangement of a program system of an engine control method according to this invention.

FIG. 5 is a diagram showing the fundamental arrangement of the program system of the control circuit in FIG. 4.

Referring to the figure, an initial processing program 202, an interrupt processing program 206, a macro processing program 228 and a task dispatcher 208 are executive programs for managing a group of tasks. The initial processing program 202 is a program for executing pre-processing operations for actuating a microcomputer. By way of example, it clears the stored contents of the RAM 106 and sets the initial values of the registers of the input/output interface circuitry 108. Further, it executes processing operations for loading input information for carrying out pre-processing operations necessary for the engine control, for example, the data of the cooling water temperature $T_w$, the battery voltage, etc. The interrupt processing program 206 accepts various interrupts, analyzes the interrupt factors, and gives the task dispatcher 208 a start request for starting a required task among the group of tasks 210 to 226. As will be explained later, the interrupt factors include an AD conversion interrupt (ADC) which generates the input information of the supply voltage, the cooling water temperature, etc., after completing the AD conversions, an initial interrupt (INTL) which is generated in synchronism with the engine crankshaft rotation, an interval interrupt (INTV) which is generated every preset constant time, for example, 10 ms, an engine stalling interrupt (ENST) which is generated upon detecting the stop state of the engine, and so on.

The respective tasks in the group of tasks 210 to 226 are assigned to task numbers representative of priority levels, and they belong to any of task levels "0" to "2". That is, the tasks 0 to 2 belong to the task level "0", tasks 3 to 5 belong to the task level "1", and tasks 6 to 8 belong to the task level "2".

The task dispatcher 208 receives the start requests of the various interrupts, and allots the occupying times of the CPU on the basis of the priority levels given to the various tasks corresponding to these start requests.

Here, the priority control of the tasks by the task dispatcher 208 conforms with the following method:

(1) The transfer of the right to execute a task of a higher priority by interrupting a task of a lower priority is made only among the task levels. Here, the level "0" shall be of the highest priority.

(2) Where, within the same task level, there is a task presently under execution or under interruption, the particular task shall be of the highest priority, and any other task cannot be executed until execution of the particular task is completed.

(3) Where, within the same task level, there are start requests for a plurality of tasks, the smaller task number shall be of a higher priority. While the processing contents of the task dispatcher 208 will be described later, this invention is constructed in order to perform the above priority control so that soft timers may be provided in the RAM task-wise, while control blocks for managing the tasks may be set in the RAM task level-wise. When execution of each task has ended, the completion of execution of the particular task is reported to the task dispatcher 208 by the macro-processing program 228.

Figure 6:
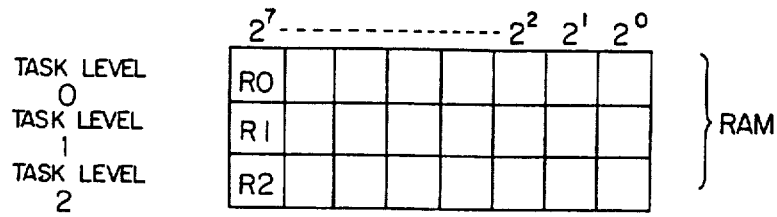
FIG. 6 is a diagram showing a table or task control blocks which are provided in a RAM managed by a task dispatcher.

Now, the processing contents of the task dispatcher 208 will be described with reference to FIGS. 6 to 12. FIG. 6 shows the task control blocks provided in the RAM which the task dispatcher 208 manages. The task control blocks are provided according to the number of the task levels, and as a group of three in correspondence with the task levels "0" to "2" in the present embodiment. Eight bits are alloted to each control block. Among them, bits 0 to 2 ($Q_0$–$Q_2$) are start bits which indicate a start request task, and bit 7 (R) is a run bit which indicates if any task within the same task level is presently under execution or under interruption. The start bits $Q_0$ to $Q_2$ are arranged in a sequence in which the execution priority is higher in the corresponding task level. By way of example, the start bit for task 4 in FIG. 5 is $Q_1$ of task level "1". Where start requests of the tasks have been issued, flags are raised in any of the start bits. On the other hand, the task dispatcher 208 retrieves the issued start requests successively from the start bit corresponding to the task of higher level, resets the flags corresponding to the issued start requests and also raises flags "1" at the run bits, and executes processing operations for starting the particular task.

Figure 7:
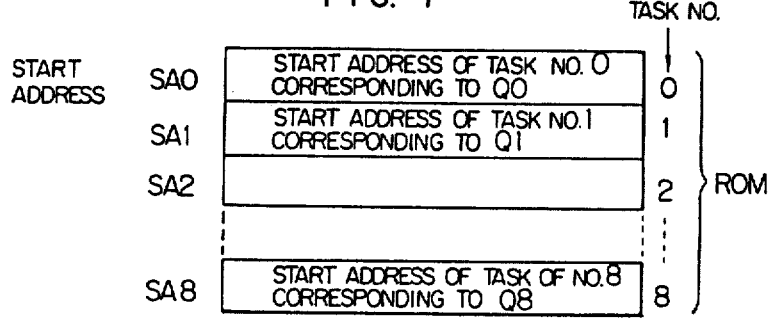
FIG. 7 is a diagram showing a start address table for a group of tasks which are started by various interrupts.

FIG. 7 shows a start address table provided in the RAM 106 which is managed by the task dispatcher 208. Start addresses SA0 to SA8 correspond to the respective tasks 0 to 8 in the group of tasks 210 to 226 shown in FIG. 5. Sixteen bits are allotted for each start address. As will be explained later, this start address information is used for starting the tasks for which the start requests have been made by the task dispatcher 208.

Figure 8:
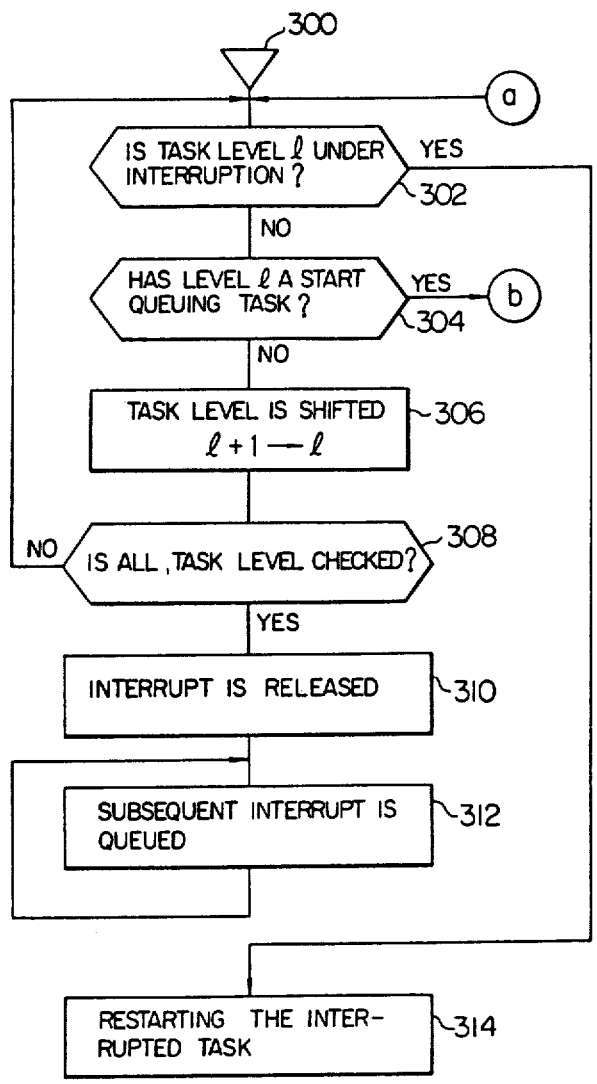

FIGS. 8 and 9 show a processing flowchart of the task dispatcher. In FIG. 8, when the processing of the task dispatcher has been started in a step 300, whether or not the execution (or run) of a task belonging to task level 1 is under interruption is decided in a step 302. More specifically, a "1" in the run bit signifies a state in which completion of execution of the task has not yet been issued to the task dispatcher 208 by the macro-processing program 228 and in which the task that was under execution is interrupted because of the occurrence of an interrupt of higher priority level. Accordingly, if the flag "1" is in the run bit, the flow jumps to a step 314 so as to restart the interrupted task.

In contrast, where the flag "1" is not in the run bit, that is, the run indicating flag is reset, the flow shifts to a step 304 so as to decide whether or not a start queuing task exists at the level 1. That is, the start bits of the level 1 are retrieved in the sequence of the higher execution or run priorities of the corresponding tasks; namely, in the sequence of $Q_0$, $Q_1$ and $Q_2$. Where the flag "1" is not in the start bits belonging to the task level 1, the flow shifts to a step 306 so as to renew the task level. That is, the task level 1 is incremented by +1 into (1+1). When the renewal of the task level has been performed in the step 306, the flow shifts to a step 308 so as to decide whether or not all the task levels have been checked. In case where all the task levels have not been checked; that is, $1 \neq 2$, the flow returns to the step 302, and the processing operations are similarly carried out by the above procedure. In case where all the task levels have been checked in the step 308, the flow shifts to a step 310 to release the interrupt. The interrupt release is made in this step because the interrupt is inhibited during the processing period of the steps 302 to 308. In the next step 312, the subsequent interrupt is queued.

Now, where a start queuing task exists at the task level 1 in the step 304; that is, where the flag "1" is in the start bit belonging to the task level 1, the flow shifts to a step 400 in FIG. 9. By means of a loop of steps 400 and 402, which of the start bits of the task level 1 contains the flag "1" is retrieved in the sequence in which the corresponding execution priorities are higher; namely, in the squence of $Q_0$, $Q_1$ and $Q_2$. When the particular start bit has been found, the flow shifts to a step 404. In the step 404, the start bit at which the flag is erect is reset, and the flag "1" is set in the run bit (hereinbelow, termed "R bit") of the particular task level 1. Further, in a step 406, the start task number is deduced, and in a step 408, the start address information of the corresponding start task is fetched by the use of the start address table provided in the RAM as shown in FIG. 7.

Subsequently, in a step 410, whether or not the corresponding start task is to be executed is determined. Here, if the fetched start address information is a specified value, for example, 0 (zero), it is determined that the corresponding task need not be executed. This decision step is necessary for affording the functions of only specified tasks selectively in dependence on the types of cars among the groups of tasks for performing the engine control. Where, in the step 410, it has been decided that execution of the corresponding task is to be stopped, the flow shifts to a step 414 so as to reset the R bit of the particlar task level 1. Further, the flow returns to the step 302, and whether or not the task level 1 is under interruption is determined. Since there can be a case where flags are present at a plurality of start bits within the same task level 1, the flow shifts to the step 302 after resetting the R bit in the step 414.

In contrast, where, in the step 410, execution of the particular task is not to be stopped but is to continue, the flow shifts to a step 412 and jumps to the particular task, whereupon the task is executed.

Figure 10:
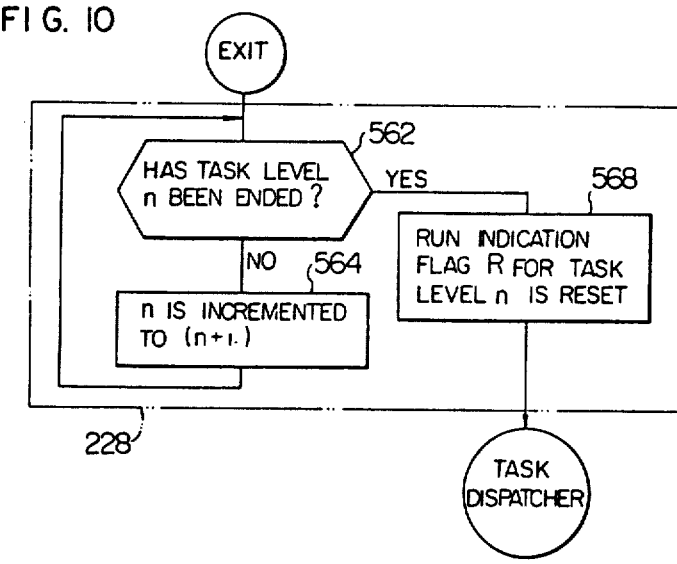
FIG. 10 is a diagram showing a processing flowchart of a macro processing program.

Now, FIG. 10 is a diagram showing a processing flowchart of the macro-processing program 228. This program consists of steps 562 and 564 for determining the completion of the task. In the steps 562 and 564, task levels are retrieved from "0" and the task level having been completed is determined. Thereafter, the flow proceeds to a step 568, in which the execution (RUN) flag of the seventh bit of the task control block of the task having been completed is reset. Thus, execution of the task has been completed. The flow returns to the task dispatcher 208 again, and the next run task is determined.

Figure 11:
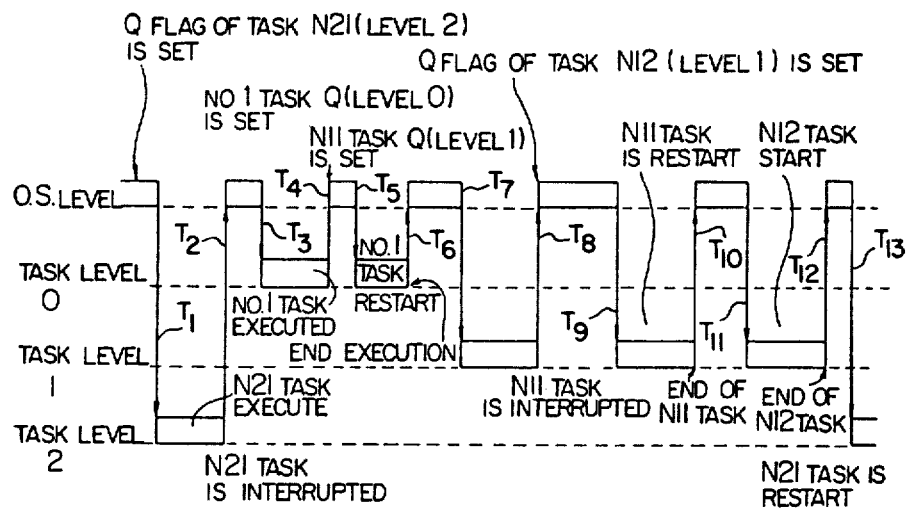
FIG. 11 is a diagram showing an example of a task priority control.

Now, occurrences of execution in interruption of tasks, where the task priority control is carried out by the task dispatcher 208, will be described with reference to FIG. 11. Here, m in the start request $N_{mn}$ denotes the task level, and n denotes the level of the priority in the task level m. Let it now be supposed that the CPU has run an executive program OS. Then, where a start request $N_{21}$ has occurred during execution of the executive program OS, execution of a task corresponding to the start request $N_{21}$ of the task 6 is started at a time $T_1$. Here, where, during execution of the task 6, a start request $N_{01}$ for a task of higher run priority occurs at a time $T_2$, the operation shifts to the executive program OS and the predetermined processing operations already explained are executed, whereupon the execution of a task corresponding to the start request $N_{01}$ or the task 0 is started at a time $T_3$. Where, during execution of the task 0, a start request $N_{11}$ occurs at a time $T_4$, the operation shifts to the executive program OS and the predetermined processing operations are executed, whereupon execution of the task 0 having been interrupted is restarted at a time $T_5$. When execution of the task 0 has ended at a time $T_6$, the operation shifts to the executive program OS again. Here, completion of execution of the task 0 is reported to the task dispatcher 208 by the macro-processing program 228. At a time $T_7$, execution of the task 3 corresponding to a start request $N_{11}$ having been queued is started. Where, during execution of the task 3, a start request $N_{12}$ of lower priority in the same task 1 occurs at a time $T_8$, execution of the task 3 is interrupted. The operation shifts to the executive program OS and the predetermined processing operations are performed, whereupon execution of the task 3 is restarted at a time T$_9$. When execution of the task 3 has ended at a time T$_{10}$, the operation of the CPU shifts to the executive program OS, and an execution completion report of the task 3 is delivered to the task dispatcher 208 by the macro-processing program 228. Subsequently, execution of the task 4 corresponding to a start request N$_{12}$ of lower priority level is started at a time T$_{11}$. When the execution of the task 4 has ended at a time T$_{12}$, the operation shifts to the executive program OS to perform the predetermined processing operations, and thereafter, execution of the task 6 having been interrupted until then and corresponding to the start request N$_{21}$ is restarted at a time T$_{13}$.

In the above manner, priority control of the tasks is executed.

Figure 12:
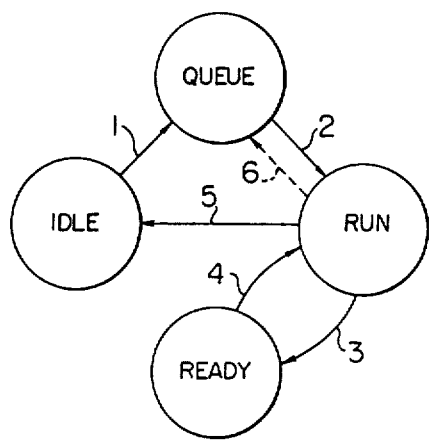
FIG. 12 is a diagram showing the state transitions of tasks in the task priority control.

The state transitions in the priority control of the tasks are shown in FIG. 12. An "Idle" state is the start queuing state, in which any start request is not yet issued for a task. When a start request is subsequently issued, a flag is set in the start bit of the task control block so as to indicate that execution is necessary. The periods of time in which the "Idle" state moves to a "Queue" state are determined depending upon the levels of the respective tasks. The sequence decision is further carried out in the queue state and depends upon priority. The particular task falls into the execution state after the flag of the start bit of the task control block has been reset by the task dispatcher 208 in the executive program OS and the flag has been raised in the R bit (seventh bit). Thus, execution of the task is initiated. This state is the "Run" state. When execution has ended, the flag of the R bit of the task control block is cleared, and execution is completed. Then, the run state is terminated, and the idle state begins again, the issuance of a new start request being awaited. However, when an interrupt IRQ has occurred during execution of the task, execution of the particular task must be interrupted. Therefore, the contents of the CPU are shunted (diverted to temporary storage), and the run is interrupted. This state is a "Ready" state. When the state in which the task is run again has subsequently begun, the contents having been shunted are returned to the CPU from the shunt area, and the run is restarted. That is, the ready state returns to the run state again. In this manner, each level program repeats the four states in FIG. 12. FIG. 12 shows a typical flow sequence, but there is the possibility that a flag will be set at the start bit of the task control block in the ready state. This corresponds to, for example, the case where a start request timing next to the particular task has been reached in the course of the start interrupt. As this time, the priority is given to the flag of the R bit, and the task being interrupted is first completed. Thus, the flag of the R bit disappears, and the queue state is established by the flag of the start bit without passing through the idle state.

In this manner, the tasks 0-8 are in any of the states in FIG. 12, respectively.

Figure 13:
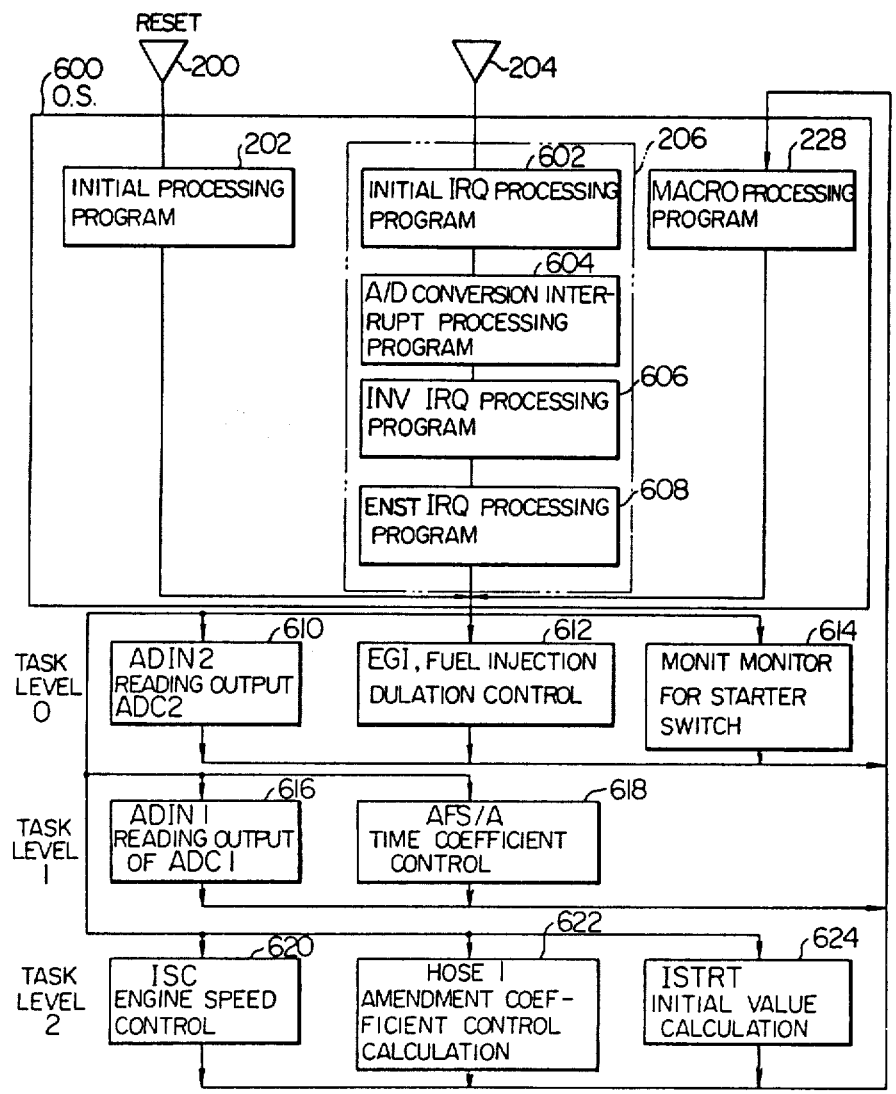
FIG. 13 is a diagram showing a concerete embodiment in FIG. 5.

FIG. 13 shows a concrete embodiment of the program system in FIG. 5. Referring to the figure, the executive program OS consists of an initial processing program 202, an interrupt processing program 206, a task dispatcher 208 and a macro-processing program 228.

The interrupt processing program 206 includes various interrupt processing programs. An initial interrupt processing ("INTL") program 602 is such that initial interrupts take place at half the number of the cylinders of the engine (that is, twice for four cylinders) per revolution of the engine by means of initial interrupt signals which are generated in synchronism with the engine crankshaft rotation. By the initial interrupt, the injection time of fuel calculated in an EGI task 612 is set in the EGI register of the input/output interface circuitry 108. An AD conversion interrupt processing 604 includes two types, which are the AD converter 1 interrupt ("ADC1") and the AD converter 2 interrupt ("ADC2"). The AD converter 1 has a precision of eight bits, and is used for the inputs of the supply voltage, the cooling water temperature, the suction temperature, the service adjustment, etc. It starts the conversion at the same time that the input point to the multiplexer 120 is designated, and it generates the ADC1 interrupt after completing the conversion. This interrupt is used only before cranking. On the other hand, the AD converter 128 is employed for the input of the air flow rate, and it generates the AD2 interrupt after completing the conversion. This interrupt is also used only before cranking.

In an interval interrupt processing program ("INTV") 606, an INTV interrupt signal is generated every time set in the INTV register, for example, 10 ms, and is used as a fundamental signal for monitoring the time of a task to be started at a fixed period. With this interrupt signal, the soft timer is renewed, and a task having reached the prescribed period is started. Further, in an engine stalling interrupt processing program ("ENST") 608, the stop state of the engine is detected. Upon detecting the INTL interrupt signal, a counting operation is started. When the INTL interrupt signal has not been subsequently detected within a predetermined time, for example, 1 second, the ENST interrupt takes place. Where the ENST interrupts have occurred three times, that is, where no INTL interrupt signal has been detected even after the lapse of, for example, 3 seconds, it is decided that the engine has stalled, and the power supply to the ignition coil and the operation of the fuel pump are stopped. After these processing operations, control is quiescent until the starter switch 152 is turned "on". An outline of the processing operations for the above interrupt factors is indicated in Table 1.

TABLE 1

| Outline of Processing Operations for Interrupt Factors | |
|---|---|
| Designation of Interrupt Factor | Outline of Processing Operation |
| INTL | The fuel injection time is set in the EGI register |
| ADC1 | Task ADIN1 is started |
| ADC2 | Task ADIN2 is started |
| INTV | The start periods of tasks ADIN2, EGI, MONIT, ADIN1, AFSIA and ISC to be started at fixed periods are checked, and the tasks having reached the prescribed periods are started |
| ENST | The engine stalling processing operations are performed, and the control is returned to the initial state |

Regarding the initial processing program 202 and the macro-processing program 228, the processing operations as already stated are executed.

The group of tasks which are started by the various interrupts are as follows. As tasks belonging to the task level 0, there are an AD2 input task ("ADIN2 task"), a fuel injection control task ("EGI") and a start monitor task ("MONIT"). As tasks belonging to the task level 1, there are an AD1 task ("ADIN1") and a time coefficient processing task ("AFSIA"). Further, as tasks belonging to the task level 2, there are an idle rotation control task ("ISC"), an amendment calculation task ("HOSEI") and a start preprocessing task ("ISTRT").

The allotment of the various task levels and the functions of the tasks are listed in Table 2.

TABLE 2

Allotment of Task Levels and Functions of Tasks

| Level | Designation of Program | Task No. | Functions | Start Period |
|---|---|---|---|---|
| 0 | OS | | Engine rotation interrupt control | at least 5 ms |
| 1 | | | Other OS processing operations | |
| 0 | ADIN2 | 0 | AD converter 2 input, calibration, filtering Acceleration control Revolution number input, calibration, filtering Fuel cut | 10 ms |
| | EGI | 1 | Fuel injection time control CO adjustment | 20 ms |
| | MONIT | 2 | Monitor of starter switch (OFF) Fuel injection time control at start Start and stop of soft timer | 40 ms |
| 1 | ADIN1 | 3 | AD converter 1 input, calibration, filtering | 50 ms |
| | AFSIA | 4 | After-start, after-idle, after-acceleration time coefficient control | 120 ms |
| 2 | ISC | 5 | Idle revolution number control | 200 ms |
| | HOSEI | 6 | Amendment coefficient calculation | 300 ms |
| | ISTRT | 7 | EGI initial value calculation, Monitor of starter switch (ON), Start and stop of soft timer, Fuel Pump, I/O LSI start | 30 ms |

As is apparent from Table 2, the start periods of the tasks to be started by the various interrupts are determined in advance. This information is stored in the ROM 104.

Figure 14:
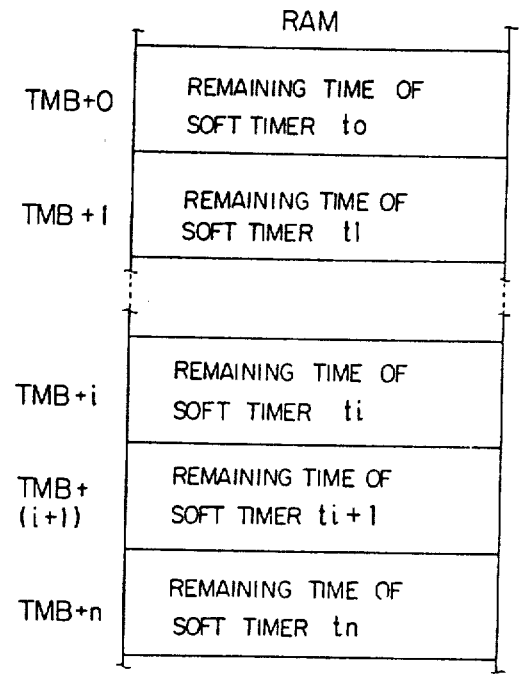
FIG. 14 is a diagram showing a soft timer table provided in the RAM.

Hereunder, the INTV interrupt processing operation will be described with reference to FIGS. 14 to 16. FIG. 14 shows a soft timer table provided in the RAM 106. This soft timer table is provided with timer blocks TMB+o ... TMB+n equal in number to the different start periods to be started by the various interrupts. Here, the "timer blocks" signify memory areas to which time information (Remaining Time Of Soft Timer to ... tn) on the start periods of the tasks stored in the ROM 104 are transmitted. TMB written at the left end in the figure signifies the first address of the soft timer table in the RAM 106. The time information on the start period (where the INTV interrupt is performed at every period of, for example, 10 ms, a value which is an integral number of times greater) is transmitted to and stored in each timer block of the soft timer table from the ROM 104 at the start of the engine.

Figure 15:
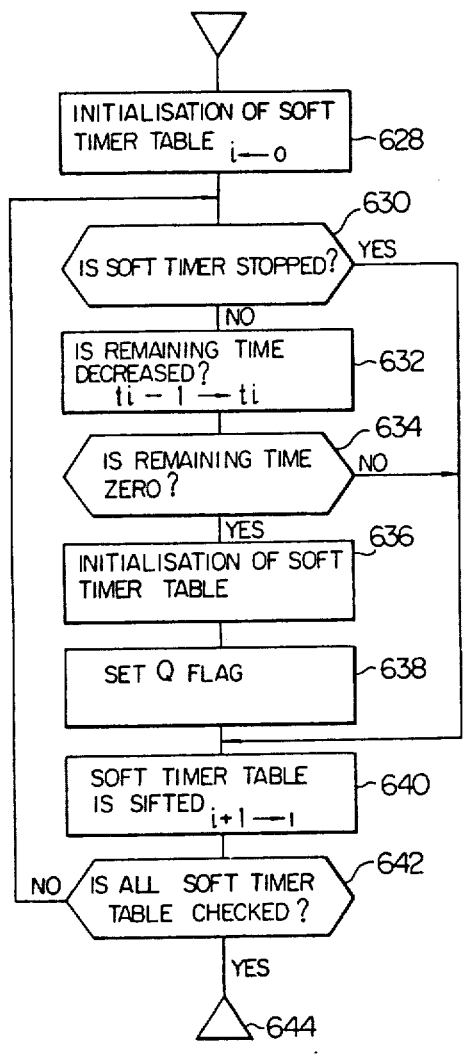
FIG. 15 is a diagram showing a processing flowchart of an INTV interrupt processing program.
Figure 16:
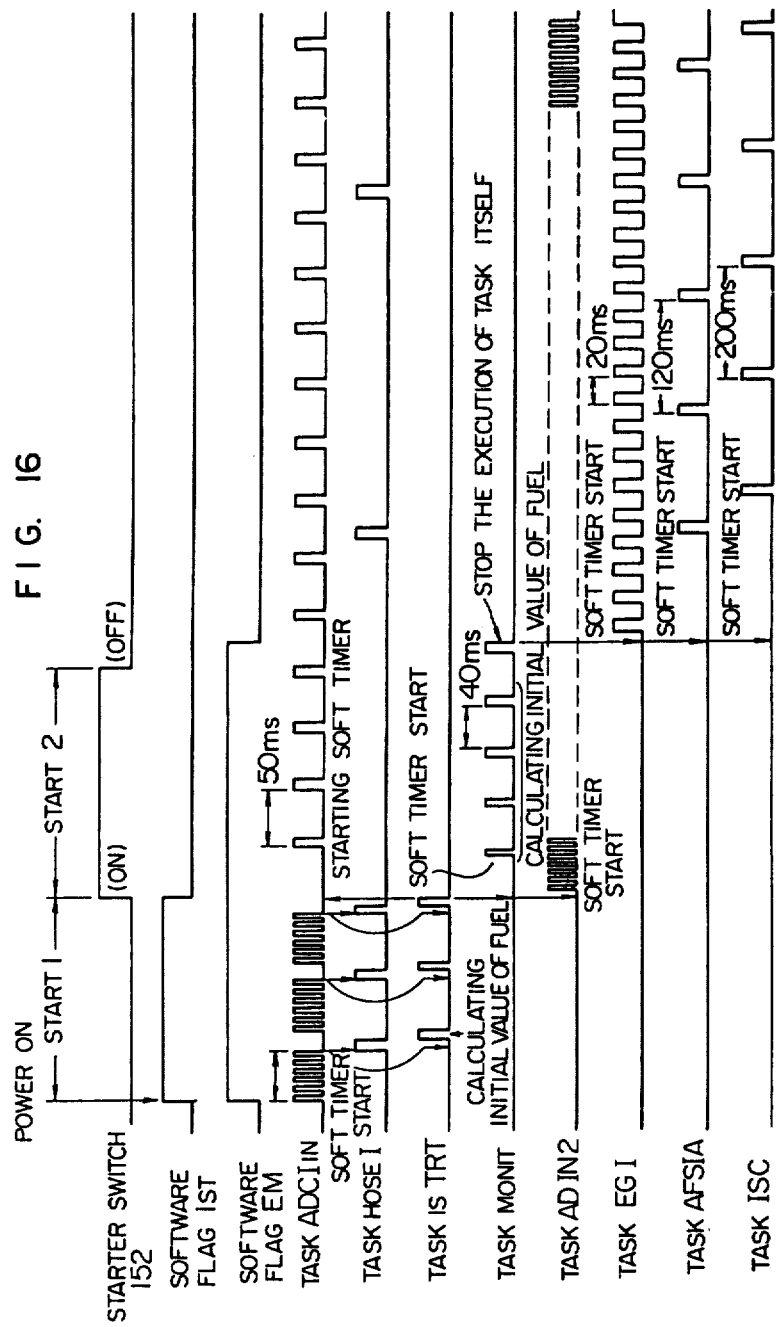
FIG. 16 is a timing chart showing a situation in which the starts and stops of various tasks are performed in dependence on the operating states of an engine.

FIG. 15 shows a processing flowchart of the INTV interrupt processing 606. Referring to the figure, when the program has been started in a step 626, the soft timer table provided in the RAM 106 is initialized in a step 628. That is, the content i of the index register is made 0 (zero), and the remaining time $T_i$ stored in the timer block of address TMB+0 of the soft timer table is checked. $T_i = T_0$ holds in this case. Subsequently, in a step 630, wherther or not the soft timer examined in the step 628 has stopped is determined. More specifically, where the remaining time $T_i$ stored in the soft timer table is $T_i = 0$, it is determined that the soft timer table is stopped, it is determined that the particular task to be started by the soft timer is stopped, and the flow jumps to a step 640 so as to renew the soft timer table.

In contrast, in case where the remaining time $T_i$ of the soft timer table is $T_i \neq 0$, the flow shifts to a step 632, in which the remaining time of the timer block is renewed. The remaining time is decremented $(-1)$ from $T_i$. Subsequently, in a step 634, it is determined whether or not the soft timer of the timer table has reached the start period. More specifically, where the remaining time $T_i$ is $T_i = 0$, it is determined that the start period has been reached, and the flow shifts to a step 636 in that case. On the other hand, where it is determined that the soft timer has not reached the start period, the flow jumps to the step 640 so as to renew the soft timer table. Where the soft timer table has reached the start period, the remaining time $T_i$ of the soft timer table is initialized in the step 636. That is, the time information of the start period of the particular task is transmitted from the ROM 104 to the RAM 106. After the remaining time $T_i$ of the soft timer table has been initialized in the step 636, the start request for the task corresponding to the soft timer table is made in a step 638. Subsequently, in the step 640, the soft timer table is renewed. That is, the content of the index register is incremented $(+1)$. Further, in a step 642, whether or not all the soft timer tables have been checked is determined. Since the $(N+1)$ soft timer tables are provided in the present embodiment as shown in FIG. 14, the check of all the soft timer tables is determined to have ended where the content i of the index register is $i = N+1$. In this case, the INTV interrupt processing program 606 ends in a step 644. In contrast, where it has been decided in the step 642 that all the soft timer tables have not been checked, the flow returns to the step 630 and the same processing operations as above stated are performed.

In the above manner, the start request for the particular task is issued in accordance with the various interrupts, and the run of the particular task is done on the basis of the request. However, all the tasks listed in Table 2 are not always run. On the basis of the operating information of the engine, the time information on the start period of any of the group of tasks provided in the ROM 104 is selected, and it is transmitted to and stored in the soft timer table of the RAM 106. Assuming by way of example that the start period of the given task is 20 ms, the task is started every 20 ms. If the start of the task needs to be continuously performed in dependence on the operating conditions, the soft timer table corresponding to the particular task is renewed and initialized at all times. Now, the situation in which the group of tasks are started and stopped by the various interrupts in accordance with the operating conditions of the engine will be described with reference to a time chart shown in FIG. 16. When power is turned "on" by actuating the starter switch 152, the CPU is placed into operation, and "1" is set up at a software flag IST and a software flag EM. The software flag IST is a flag indicating that the engine is in the start before starting, while the software flag EM is a flag for inhibiting the ENST interrupt. Owing to these two flags, it is determined whether the engine is in the state before starting, is under starting or in the state after starting. When the power "on" state has been established by actuating the starter switch 152, the task ADIN1 is started first of all, and data necessary for starting the engine, for example, input information such as the cooling water temperature and the battery voltage are applied to the AD converter 122 through the multiplexer 120 by means of the various sensors. The task HOSEI is started every cycle of inputs of these data, amendment calculations being performed on the basis of the input information. Every cycle of inputs of the data from the various sensors to the AD converter 122 by the task ADIN1, the task ISTRT is started to calculate the quantity of fuel injection necessary during the starting of the engine. The above three tasks, i.e., task ADIN1, task HOSEI and task ISTRT are started by the initial processing program 202.

When the starter switch 152 has been turned "on", starts are applied to the three tasks of task ADIN1, task MONIT and task ADIN2 by the interrupt signal of the task ISTRT. These tasks need to be run only in the period of time in which the starter switch 152 is in the "on" state (during the cranking of the engine). In the period of time, from the ROM 104, the time information of the predetermined start periods are transmitted to and stored in the soft timer tables provided in the RAM 106 and respectively corresponding to the tasks. In the period of time, the remaining time $T_i$ of the start period of the soft timer table is initialized, and the start period is repeatedly set. The task MONIT is a task for calculating the quantity of fuel injection at the engine start, and it is unnecessary after the engine start. Therefore, when the run of the task has ended a predetermined number of times, the start of the soft timer is stopped, and the stop signal issued at the task end is used to start the group of other tasks required after the engine start. Here, the stop of the task is performed by the soft timer in such a way that "0" is written into the corresponding soft timer table of the task by a signal indicative of the task end at the time of decision of the end of the task, in order words, that the content of the soft timer is cleared. As thusfar described, the present embodiment is constructed so as to simply carry out the starts and stops of the tasks by means of the soft timers, and hence, it becomes possible to execute an efficient and reliable management for the plurality of tasks having the unequal start periods.

Figure 17:
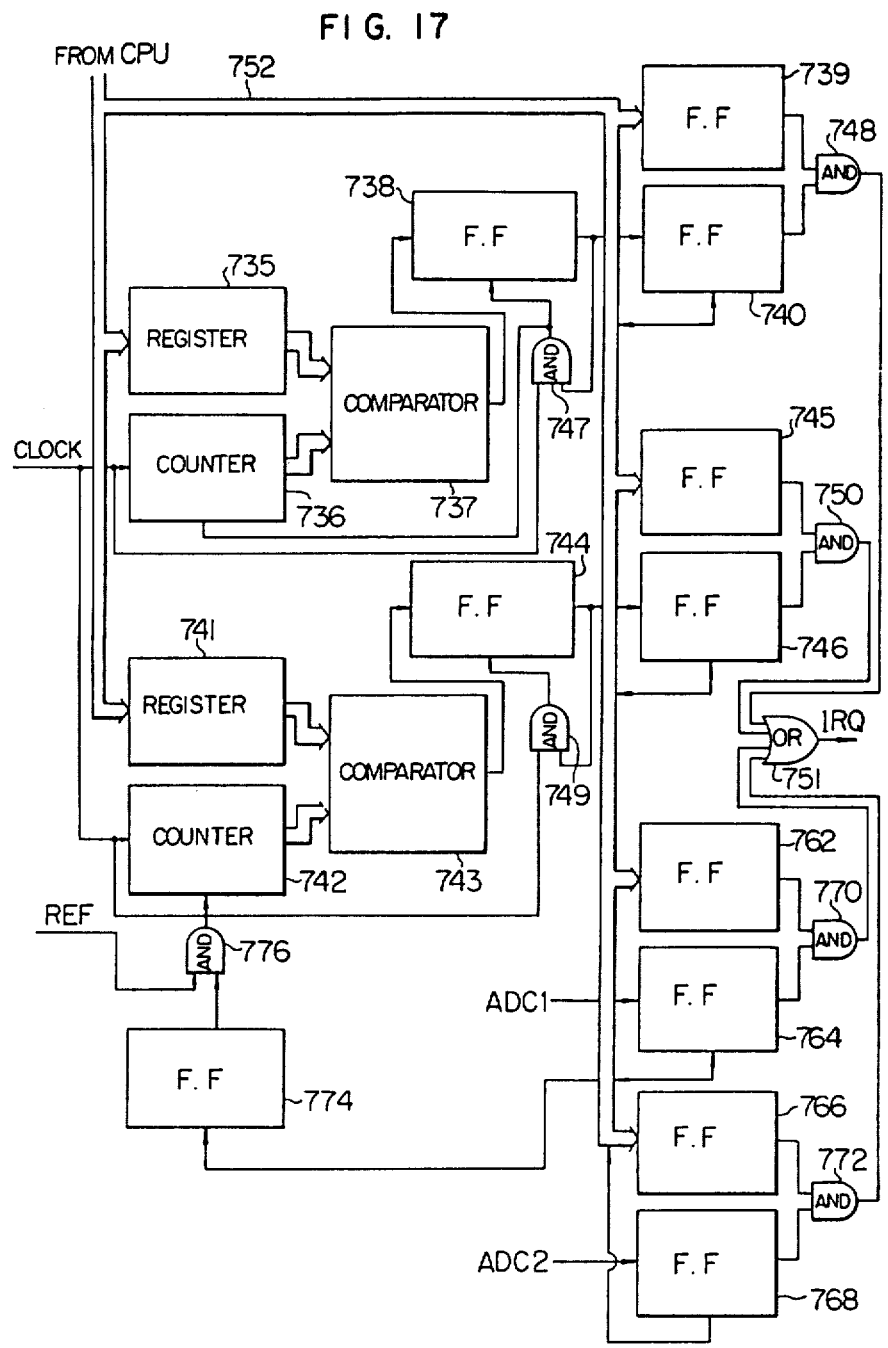
FIG. 17 is a diagram of a generator circuit for interrupts.

Now, an IRQ generator circuit is shown in FIG. 17. A register 735, a counter 736, a comparator 737 and a flip-flop 738 constitute a generator circuit for the INTV IRQ. The generation period of the INTV IRQ, for example, 10 (ms) in the present embodiment is set in the register 735. On the other hand, clock pulses are set in the counter 736. When the count value of the counter 736 corresponds to the content of the register 735, the flip-flop 738 is brought into the set state. The counter 736 is cleared by the set state, and restarts the counting. Accordingly, the INTV IRQ is generated every fixed time (10 msec).

A register 741, a counter 742, a comparator 743 and a flip-flop 744 constitute a generator circuit for the ENST IRQ which senses the stopping of the engine. The register 741, the counter 742 and the comparator 743 are the same as in the above, and the ENST IRQ is generated when the count value has reached the value of the register 741. During the rotation of the engine crankshaft, however, the counter 742 is cleared by the REF pulses which are generated at the intervals of the fixed crank angle from the crank angle sensor, so that the count value of the counter 742 does not reach the value of the register 741 and that the ENST IRQ does not appear.

The INTV IRQ generated in the flip-flop 738, the ENST IRQ generated in the flip-flop 744, and the IRQ generated in the ADC1 or ADC2 are respectively set in flip-flops 740, 746 and 764 or 768. Signals for generating or inhibiting the IRQs are set in flip-flops 739, 745, 762 and 766. If "H" is set in the flip-flops 739, 745, 762 and 766, AND gates 748, 750, 770 and 772 are enabled. When the IRQ is generated, it is immediately provided from an OR gate 751.

Accordingly, depending upon whether "H" or "L" is put into the respective flip-flop 739, 745, 762 and 766, it is possible to inhibit the generation of the IRQ or to release the inhibition. When the IRQ has been generated, the cause for the generation of the IRQ is known by loading the contents of the flip-flops 740, 746, 764 and 768 into the CPU.

Where the CPU has begun to run the program in response to the IRQ, the IRQ signal needs to be cleared, and hence, one of the flip-flops 740, 746, 764 and 768 as concerns the IRQ having begun execution is cleared.

Figure 18:
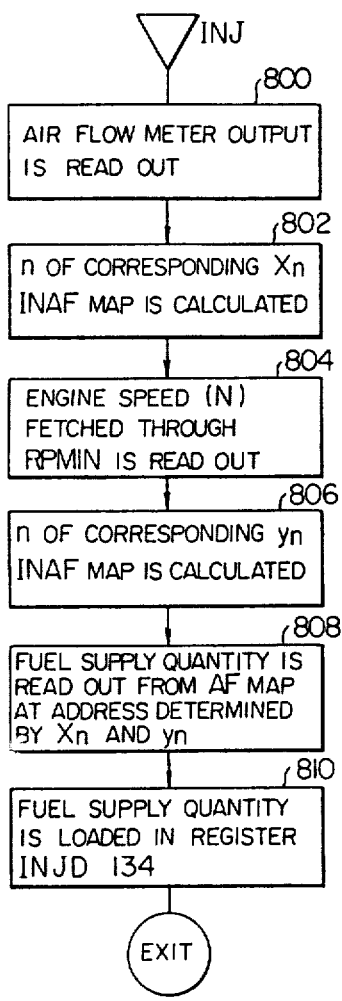
FIG. 18 is a flowchart of the INJ program.

FIG. 18 is a flowchart of the INJ program which is activated at a time interval or period of 20 m.sec. At a step 800, the digital value QA representing the output signal from the air flow meter 24 and stored in RAM 106 through execution of the task ADC2IN after A-D conversion is read out. At a step 802, the actual value of QA read out at the step 800 is compared with QA values set at $x_n$ of an AF map provided in ROM 104, to thereby determine n of $x_n$ corresponding to the actual value of QA. At a step 804, the engine speed data N stored in RAM through execuation of the task RPMIN is read out. At a step 806, the actual value of N as read out is compared with the values of N set at $y_n$ in the AF map, to thereby determine n of $y_n$ corresponding to the actual value of N. At a step 808, an adddress of the AF map is determined on the basis of $x_n$ and $y_n$ determined at the steps 802, respectively. The fuel supply quantity stored at the determined address is read out and placed in the register INJD 134 shown in FIG. 4 at a step 810.

Figure 19:
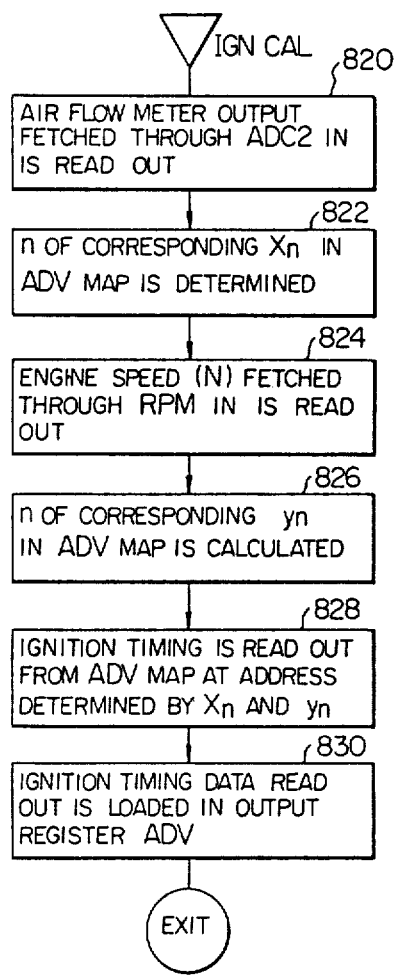
FIG. 19 shows a flowchart of the program IGNCAL.

FIG. 19 shows a flowchart of the program IGNCAL. At a step 802, digital value QA representing the output from the air flow meter and stored in RAM through execution of the program ADC2IN is read out. At a step 822, the actual value of QA as read out is compared with values of QA set at $x_n$ of ADV map provided in ROM 104, to thereby determine n of $x_n$ which corresponds to the actual value of QA. At a step 824, the engine speed data N stored in RAM through execution of RPMIN is read out. At a step 826, the actual value of N as read out is compared with values of N set as $y_n$ of the ADV map to thereby determine n of $y_n$ which corresponds to the actual value of N. At a step 828, an address in the ADV is determined on the basis of $x_n$ and $y_n$ determined at the steps 822 and 826, respectively. At a step 830, the ignition timing stored at the determined address is read out and placed in the register ADV shown in FIG. 4.

The program HOSEI is provided for determining correction coefficients for temperatures of the atmosphere and cooling water, for example. Since these parameters undergo only slow changes, it is sufficient to determine the correction coefficients at a long interval.

The program ADC2IN is disclosed, for example, in U.S. application Ser. No. 952,275, filed Oct. 18, 1978, in the name of Masao Takato et al, under the title "Input Signal Processor Used In Electronic Engine Control Apparatus", now U.S. Pat. No. 4,280,189, and assigned to Hitachi, Ltd., and U.S. application Ser. No. 078,468, filed Sept. 24, 1979, in the name of Takao Sasayama et al, under the title "Hot-Wire Flow Rate Measuring Apparatus", Now U.S. Pat. No. 4,297,881, and assigned to Hitachi, Ltd.

The program RPMIN is disclosed in U.S. application Ser. No. 137,519, filed Apr. 4, 1980, now U.S. Pat. No. 4,337,513, for example.

The program DWLCAL is disclosed, for example, in U.S. application Ser. No. 121,476, filed Feb. 14, 1980, in the name of Toshio Furuhashi, under the title "Method For Controlling An Internal Combustion Engine", now U.S. Pat. No. 4,298,941, and assigned to Hitachi, Ltd.

An example of the program ENST is disclosed in U.S. Ser. No. 952,531, filed Oct. 18, 1978, in the name of Masumi Iwai et al, under the title "Electronic Engine Control Apparatus" now U.S. Pat. No. 4,312,038 and assigned to Hitachi, Ltd.

Figure 20:
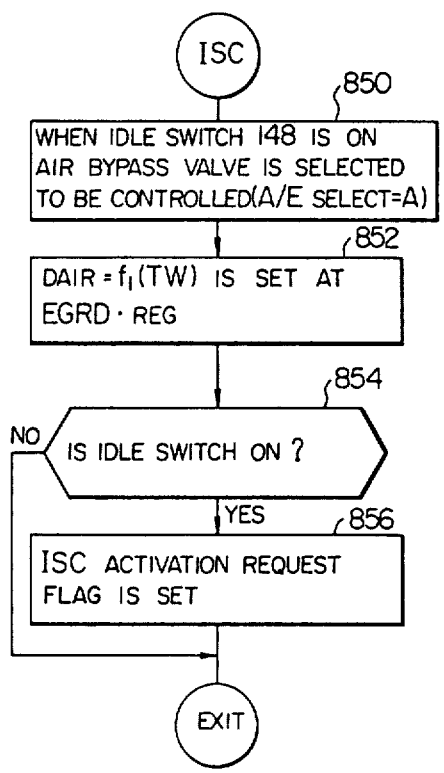
FIG. 20 is a flowchart to illustrate details of a program ISC.

The program ISC is provided for controlling the opening degree of the air bypass valve 62 in the idling operation. FIG. 20 shows the details of this program.

When it is determined that the idle switch 148 is turned on by monitoring DIO of FIG. 4 at a step 850, the first bit of the register DOUT is set at level "L", whereby the air bypass valve 62 is designated. Thus, the air bypass valve is controlled in dependence on the value placed in the register EGRD of FIG. 4. The air bypass valve 62 serving for controlling the air flow through the bypass passage is controlled in the specific operating conditions. More particularly, in the case of operation at a low ambient temperature such as in winter, starting operation in the cooled state of engine, operation under large load due to the use of a car air conditioner or the like, the air flow through the bypass passage is increased.

At a step 852, the duty factor of the air bypass valve is determined and set at the register EGRD in dependence on the temperature of engine cooling water.

At a step 854, it is determined whether the idle switch 148 is closed or not. If the switch is closed, then activation request flag for the program ISC is set at a step 856. In other words, bit "1" is set at Q10 of the task control word TCW10 of RAM shown in FIG. 16. Simultaneously, the first bit of the register DOUT of DIO 174 is set at level "L".

Subsequently, an end indication is issued.

On the other hand, when the idle switch is opened, an end indication is immediately made. Accordingly, this program is no longer executed. In this way, when the idle switch is closed at the step 856, the activation request flag for the program ISC is set and then the end indication is made.

Figure 21:
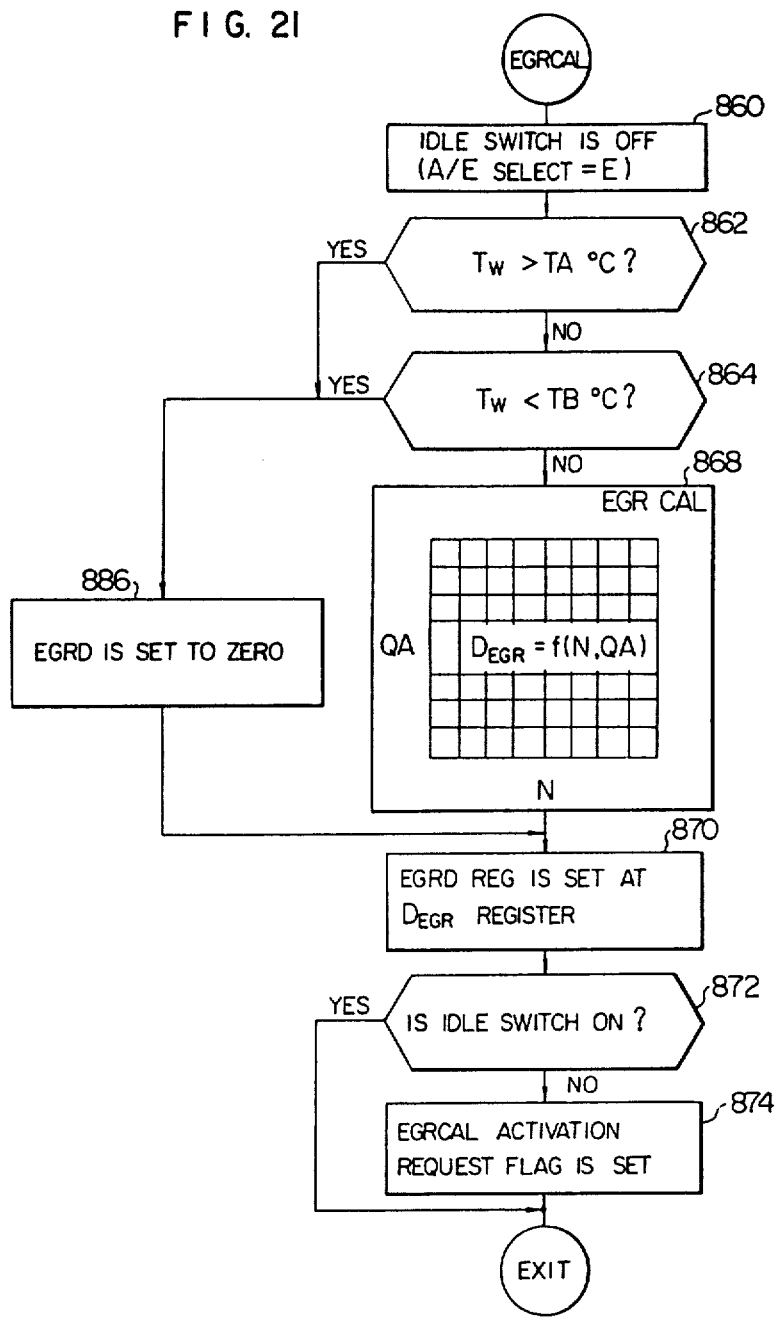
FIG. 21 is a flowchart to illustrate details of a program EGR CAL.

FIG. 21 shows a flowchart of the program EGRCAL. When the idle switch is in the opened state, the air bypass valve 90 is not controlled, but the recirculation of exhaust gas is effected. To this end, the EGR system for controlling the exhaust gas recirculation quantity is driven. For driving the EGR system, the first bit in the register DOUT of DIO is set to the level "H" at a step 860, whereby the EGR system shown in FIG. 3 is driven in accordance with the value set at the register EGRD of FIG. 4. Next, an arithmetic operation for determining EGR quantity is carried out. At a step 862, it is checked whether the cooling water temperature TW is higher than a predetermined value TA °C. If the answer is affirmative, EGR operation is inhibited or cut. To this end, zero is set at the EGRD register for effecting EGR CUT at a step 866. When the cooling water temperature TW is found to be lower than the predetermined value TA °C, the program proceeds to the step 864 where it is decided whether the temperature TW of cooling water is lower than a predetermined value TB °C. If so, the EGR operation is inhibited. To this end, zero is set at the EGRD register at a step 866. The temperature TA at the step 862 represents the upper limit, while the temperature TB at the step 864 represents the lower limit. Only when the temperature TW of the engine cooling water lies in the range between TA and TB, is the EGR operation carried out. Namely, the program proceeds to a step 868 where the EGR quantity is arithmetically determined on the basis of the suction air quantity QA and the revolution number N of the engine through the map retrievals. The map employed for this retrieval is provided in ROM 104. The retrieved values are set at the register EGRD. In this manner, the value for EGR is opened in dependence on the value placed in the register EGRD and the duty cycle previously set at the register EGRP, whereby EGR operation is carried out.

At a step 872, it is decided whether the idle switch is in the closed state by monitoring the DIO. When the idle switch is opened, an activation request flag for the program EGRCAL is set. In other words, the bit "1" is set at Q11 of the task control word TCW11 of RAM. Further, the first bit of the register DOUT of the DIO is set at the level "H".

Subsequently, an end indication is made.

Although the above embodiment of this invention has been described in connection with the engine control of an automobile, it is a matter of course that the invention is not restricted thereto but that it is also applicable to other computer control systems.

In this invention described above, the soft timers are provided task-wise, or the control blocks for managing the tasks are set task level-wise in the RAM so that for every execution of the task, an execution completion report of the particular task may be made. It is, therefore, possible to realize an engine control method which achieves a reduction of the load factor of the microprocessor and enhancement of controllability.

We claim:

1. In a control system for electronically controlling the operation of an internal combustion engine said control system including sensors for detecting operating conditions of said engine, an arithmetic unit for arithmetically determining control quantities for controlling said engine through digital processing of output signals produced from said sensors, memory means for storing therein programs and data for performing said arithmetic operations, and control means for controlling said engine in response to the results of said arithmetic operation, said programs being classified as a plurality of tasks on the basis of control functions thereof, each classified task having a start period respectively set in accordance with its influence on the engine and priority level respectively;

a method of controlling the operation of said control system comprising executing said programs by performing the steps of:

A a first step of setting a start request flag into the memory means in response to the expiration of a start period, B a second step of searching for said start request flag successively from tasks of higher levels, C a third step of reading out a start address of the particular task on the basis of the search results of the second step, D a fourth step of executing the particular task, setting a run flag by use of a start address and resetting the start request flag, and E a fifth step for resetting said run flag on the basis of an end of execution of said particular task, and F a sixth step for repating the first to fifth steps, whereby control of the operation of the system is effected by execution of said tasks in the course of performing said first through sixth steps.

2. A control method according to claim 1, wherein said memory means includes a plurality of level areas in accordance with said priority levels of the programs and each level area includes the start request flag areas corresponding to the programs of the corresponding priority level, said first step setting the start request flag into the corresponding start request flag area of the memory means, and said second step searching said start request flags successively from the higher level area.

3. A control method according to claim 2, wherein said each level area of the memory means includes a run flag area, said fourth step setting the run flag into the run flag area of corresponding priority level, and said fifth step resetting the run flag of the corresponding level on the basis of an end of the execution of the task.

4. A control method according to claim 3, wherein said second step further includes G a seventh step for searching the setting condition of said run flag of the higher level task group, H an eighth step for searching the setting condition of said start request flags of said tasks included in the higher level in accordance with the result of the seventh step, I a ninth step for searching the setting condition of said run flag of the lower level task group in accordance with the result of the seventh step, and J a tenth step for searching the setting condition of said start request flags of said tasks included in the lower level in accordance with the result of the ninth step.

5. A control method according to claim 4, further including

K an eleventh step for searching an interrupted task and executing the remainder of the interrupted task in response to the result of the seventh or ninth step, and a twelveth step for starting the execution of the task in correspondence with the start request flag in response to the result of the eighth or tenth step.

6. A method of controlling the operation of a processor-controlled system in which output signals are produced as a result of the processor carrying out a plurality of tasks, the functions of which affect the operation of said system, comprising the steps of:

(a) storing, in memory, a plurality of task programs through the execution of which said tasks are performed, each task program having a prescribed program level of priority assigned thereto in accordance with its functional effect on the operation of said system, and those task programs which share the same level of priority having assigned thereto respective sub-levels of priority relative to each other;

(b) storing, in memory, task control blocks respectively associated with said program levels of priority, each task control block having a first segment the contents of which are representative of whether or not there is an execution request for each respective task program having that priority level, and a second segment representative of whether any task program having that priority level is being executed or interrupted;

(c) searching the first segments of said task control blocks successively from higher to lower levels of priority for the presence of an execution request; and (d) in response to step (c) finding an execution request, causing the second segment of the task control block in the first segment of which the execution request was found in step (c) to be representative of the execution of a task program the priority level of which is associated with that task control block and executing said task program corresponding to said execution request to produce output signals for controlling said processor-controlled system.

7. A method according to claim 6, wherein said first segment is comprised of a plurality of bits, respective ones of which are associated with respective tasks having that priority level.

8. A method according to claim 7, wherein the order of the bits of said plurality corresponds to the order of said respective sub-levels of priority.

9. A method according to claim 6, further comprising the step of:

(e) storing, in memory, the starting address of each task program in accordance with its program level of priority and its sub-level of priority.

10. A method according to claim 6, wherein step (d) further comprises the step of causing the contents of the first segment of the task control block in which an execution request was found in step (c) to indicate the absence of an execution request for said task program.

11. A method according to claim 6, further comprising the steps of:

(e) storing, in memory, the starting address of each program task in accordance with its program level of priority and its sub-level of priority, and wherein, step (d) further comprises accessing the starting address of said task program to be executed in accordance with the contents of the first segment of the task control block in which an execution request was found in step (c).

12. A method according to claim 11, further comprising the steps of:

(c) searching the first segments of said task control blocks successively from higher to lower levels of priority for the presence of an execution request, (d) in response to step (c) finding an execution request, causing the segment of the task control block in the first segment of which the execution request was found in step (c) to be representative of the execution of a task the priority level of which is associated with that task control block and executing said task.

13. A method according to claim 11, wherein step (e) further comprises:

causing the contents of the starting address of a selected task program, the execution of which is to be inhibitted, to contain a prescribed program execution prevention code, whereby access thereto in step (d) prevents the execution of said selected task program.

14. A method according to claim 6, wherein the times of occurrence of execution requests for task programs of one level of priority are different than the times of occurrence of execution requests for task programs of another level of priority.

15. A method according to claim 6, wherein said processor-controlled system comprises a combustion engine control system having sensor means for supplying engine condition signals representative of operating conditions of said engine in response to which said processor carries out said plurality of tasks, and wherein each sub-level task is associated with a respective engine function corresponding to a respective effect on engine operation.

16. A method according to claim 6, wherein step (b) comprises the steps of:
storing, in memory, first data in accordance with which execution requests are to be generated and second data associated with respective task programs,
successively modifying said second data, and
in response to respective second data defining a prescribed relationship with respect to respective first data, causing the first segment of its associated task control block to be representative of the presence of an execution request.

17. A method according to claim 16, further comprising the steps of:
(e) storing, in memory, the starting address of each program task in accordance with its program level of priority and its sub-level of priority, and wherein,
step (d) further comprises accessing the starting address of said task program to be executed in accordance with the contents of the first segment of the task control block in which an execution request was found in step (c).

18. A method according to claim 17, wherein, in memory, the order of arrangement of respective starting addresses of task programs associated with respective execution requests corresponds to the order of arrangement of said second data.

19. A method of controlling the operation of a processor-controlled system in which output signals are produced as a result of the processor carrying out a plurality of tasks, the functions of which affect the operation of said system, comprising the steps of:
(a) storing, in memory, a plurality of task programs through the execution of which said tasks are performed;
(b) storing, in memory, on a priority basis data associated with said task programs representative of whether or not there is an execution request for a respective task program;
(c) searching said memory for the presence of execution request data; and
(d) selectively causing the execution of a selected task program for which execution request data has been stored in step (b) to produce output signals for controlling said processor-controlled system; and wherein,
step (d) includes the step of selectively inhibiting the execution of a selected task program irrespective of the storage in step (b) of an execution request for that task program.

20. A method according to claim 19, further comprising the step of:
(e) storing, in memory, the starting address of each program task to be accessed in the process of executing task programs in accordance with step (d); and wherein
step (d) comprises
causing the contents of the starting address of a selected task program, the execution of which is to be inhibitted, to contain a prescribed program execution prevention code, whereby access thereto prevents the execution of said selected task program.

21. A method according to claim 11, further including the step of:
(e) storing, in memory, prescribed data representative of the non-execution of a task program; and wherein
step (d) includes the step of accessing said prescribed data, thereby selectively inhibitting the execution of said selected task program.

22. A method according to claim 19, further comprising the step of:
(e) storing, in memory, a set of addresses associated with the task program to be accessed in the process of executing task programs in accordance with step (d); and wherein
step (d) comprises
causing the contents of an address associated with a selected task program, the execution of which is to be inhibited, to contain a prescribed program execution prevention code, whereby access thereto prevents the execution of said selected task program.

23. A method according to claim 19, wherein said processor-controlled system comprises a combustion engine control system having sensor means for supplying engine condition signals repersentative of operating conditions of the engine in response to which said processor carries out said plurality of tasks, each task program being comprised of a plurality of subtasks and associated with a respective engine function corresponding to a respective effect on engine operation.

24. A method according to claim 23, wherein each task program has a prescribed level of priority assigned thereto in accordance with its functional effect on the operation of said system, and wherein those subtasks which share the same level of priority have assigned thereto respective sub-levels of priority relative to each other.

25. A method according to claim 24, wherein step (b) comprises storing, in memory, task control blocks respectively associated with said program levels of priority, each task control block having a first portion the contents of which are representative of whether or not there is a execution request for each respective subtask having that priority level, and a second segment representative of whether any task having that priority level is being executed or interrupted.

26. A method according to claim 25, wherein step (b) comprises the steps of:
storing, in memory, first data in accordance with which execution requests are to be generated and second data associated with respected task programs,
successively modifying said second data, and
in response to respective second data defining a prescribed relationship with respect to respective first data, causing the first portion of its associated task control block to be representative of the presence of an execution request.

27. A method according to claim 26, further comprising the step of:
(e) storing, in memory, the starting address of each program task in accordance with its program level of priority and its sub-level of priority, and wherein step (d) further comprises accessing the starting address of said task program to be executed in accordance with the contents of the first portion of the task control block in which execution request data was found in step (c).

28. A method according to claim 27, wherein, in memory, the order of arrangement of respective starting addresses of task programs associated with respective execution request data corresponds to the order of arrangement of said second data.

29. A method according to claim 28, wherein step (d) comprises:
in response to step (c) finding an execution request, the corresponding task program for which is not to be selectively inhibitted, causing the second portion of the corresponding task control block to be representative of the execution of the task, and causing the contents of the first portion of the task control block to indicate the absence of an execution request for said task.

* * * * *